United States Patent
Gahlot et al.

(10) Patent No.: US 11,314,436 B1
(45) Date of Patent: Apr. 26, 2022

(54) METHOD AND APPARATUS FOR DYNAMICALLY ADJUSTING DIFFERENTIATED SHARE PRIORITIZATION IN A STORAGE SYSTEM

(71) Applicant: EMC IP HOLDING COMPANY LLC, Hopkinton, MA (US)

(72) Inventors: Jai Gahlot, Pune (IN); Shiv Kumar, Pune (IN); Amit Chauhan, Pune (IN)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/237,125

(22) Filed: Apr. 22, 2021

(51) Int. Cl.
*G06F 3/06* (2006.01)

(52) U.S. Cl.
CPC ............ *G06F 3/0644* (2013.01); *G06F 3/061* (2013.01); *G06F 3/067* (2013.01); *G06F 3/0631* (2013.01); *G06F 3/0653* (2013.01); *G06F 3/0664* (2013.01)

(58) Field of Classification Search
CPC ...... G06F 3/061; G06F 3/0631; G06F 3/0644; G06F 3/0653; G06F 3/0664; G06F 3/067
See application file for complete search history.

(56) References Cited

U.S. PATENT DOCUMENTS

| 2017/0251058 | A1* | 8/2017 | Zachariassen | ...... H04L 67/1097 |
| 2021/0011779 | A1* | 1/2021 | Fang | ...... G06F 3/061 |

OTHER PUBLICATIONS

J. M. Boley, E. Jung and R. Kettimuthu, "Adaptive QoS for data transfers using software-defined networking," 2016 IEEE International Conference on Advanced Networks and Telecommunications Systems (ANTS), 2016, pp. 1-6. (Year: 2016).*

* cited by examiner

*Primary Examiner* — Khoa D Doan
(74) *Attorney, Agent, or Firm* — Anderson Gorecki LLP

(57) ABSTRACT

A Software Defined Network Attached Storage (SDNAS) executes on a storage system to provide access to shared file systems, referred to as "shares", on the storage system. Users access the shares using protocol clients. A share priority table is maintained by the SDNAS and used to specify share priorities on the storage system. A share priority adjustment process is used to dynamically adjust the share priority values based on average usage values computed using a weighted usage function, and optionally based on limited ranges. The weighted usage function considers the average number of protocol client connections on the share, the average number of read operations on the share, whether the share supports continuous availability, and other factors. The adjusted share priority values are used to specify IO priorities which used by the operating system scheduling mechanism to schedule the IO operations and to establish CPU priorities for the IO operations.

20 Claims, 8 Drawing Sheets

FIG. 3

| Share Priority Table 210 | | | |
|---|---|---|---|
| Share ID 305 | Share Name 310 | Share Path 315 | Share Priority 320 |
| SID0001 | Oracle App Data | /vo10/data/oracle_data | 0 |
| SID0008 | Concert Raw | /vo16/users/userid/concert/raw_videos | 56 |
| ••• | ••• | ••• | ••• |
| SID1132 | SQL db | /vo33/msft/sqldb | 10 |

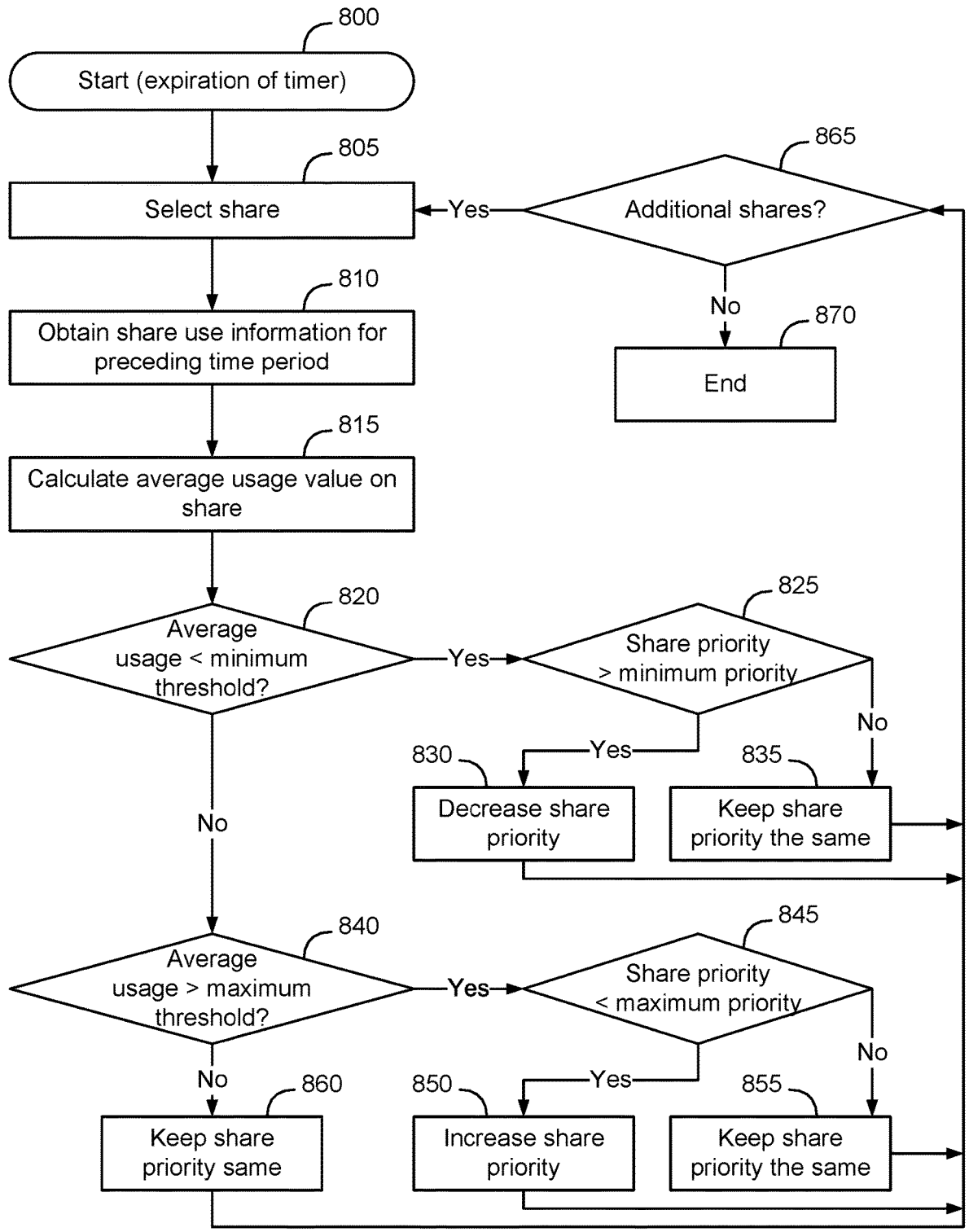

METHOD AND APPARATUS FOR DYNAMICALLY ADJUSTING DIFFERENTIATED SHARE PRIORITIZATION IN A STORAGE SYSTEM

FIELD

This disclosure relates to computing systems and related devices and methods, and, more particularly, to a method and apparatus for dynamically adjusting differentiated share prioritization in a storage system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A Software Defined Network Attached Storage (SDNAS) process executes on a storage system to provide access to shared file systems, referred to herein as "shares", maintained by the storage system. Users access the shares using protocol clients. To enable the SDNAS to provide differentiated prioritization between the various shares, a share priority table is maintained by the SDNAS. The share priority table may be specific to the SDNAS process, or commonly accessed by multiple SDNAS processes. As shares are created, or optionally after the shares have been created, each share is assigned a share priority which is stored in the share priority table. When an IO operation is received from a protocol client on a share, the SDNAS process determines a share priority value of the share from the share priority table. The share priority value is used to specify an IO priority which is transmitted to the storage system operating system, and used by the operating system scheduling mechanism to differentiate prioritization between IO operations on different shares. The share priority value is also used to adjust the CPU priority of the IO operation.

As shares are created, an initial share priority is assigned to the share, either manually by a system administrator or a default share priority is assigned by the SDNAS. Periodically, a daemon adjusts share priorities of the various shares based on use factors, such as the average number of protocol client connections on a share, the average number of reads on the share, and whether the share supports Server Message Block (SMB) continuous availability. The use factors are used to determine an average usage value for the share over the preceding time period, and the average usage value is compared with minimum and maximum usage thresholds. Shares with average usage values above the maximum usage threshold have their share priority increased. Shares with average usage values below the minimum usage threshold have their share priority decreased. Shares with average usage values in between the maximum and minimum threshold have no adjustment to their share priority. The amount of variation of share priority values may be limited, depending on the implementation. By continuously adjusting the share priorities of the shares, shares with higher average usage values are able to be provided with temporarily higher share priority, to thus reduce latency associated with access operations on the more frequently accessed shares. This provides the SDNAS with the ability to give preferential treatment to protocol clients accessing more frequently used shares, provides better throughput for mission critical applications, and enables the system to dynamically adapt to changes in workload on the shares.

BRIEF DESCRIPTION OF THE DRAWINGS

FIG. 3 is a functional block diagram of an example data structure configured to implement a share priority table for use by the software defined network attached storage processes to provide differentiated share prioritization in a storage system, according to some embodiments.

FIG. 8 is a flowchart of another example process of dynamically adjusting differentiated share prioritization in a storage system, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
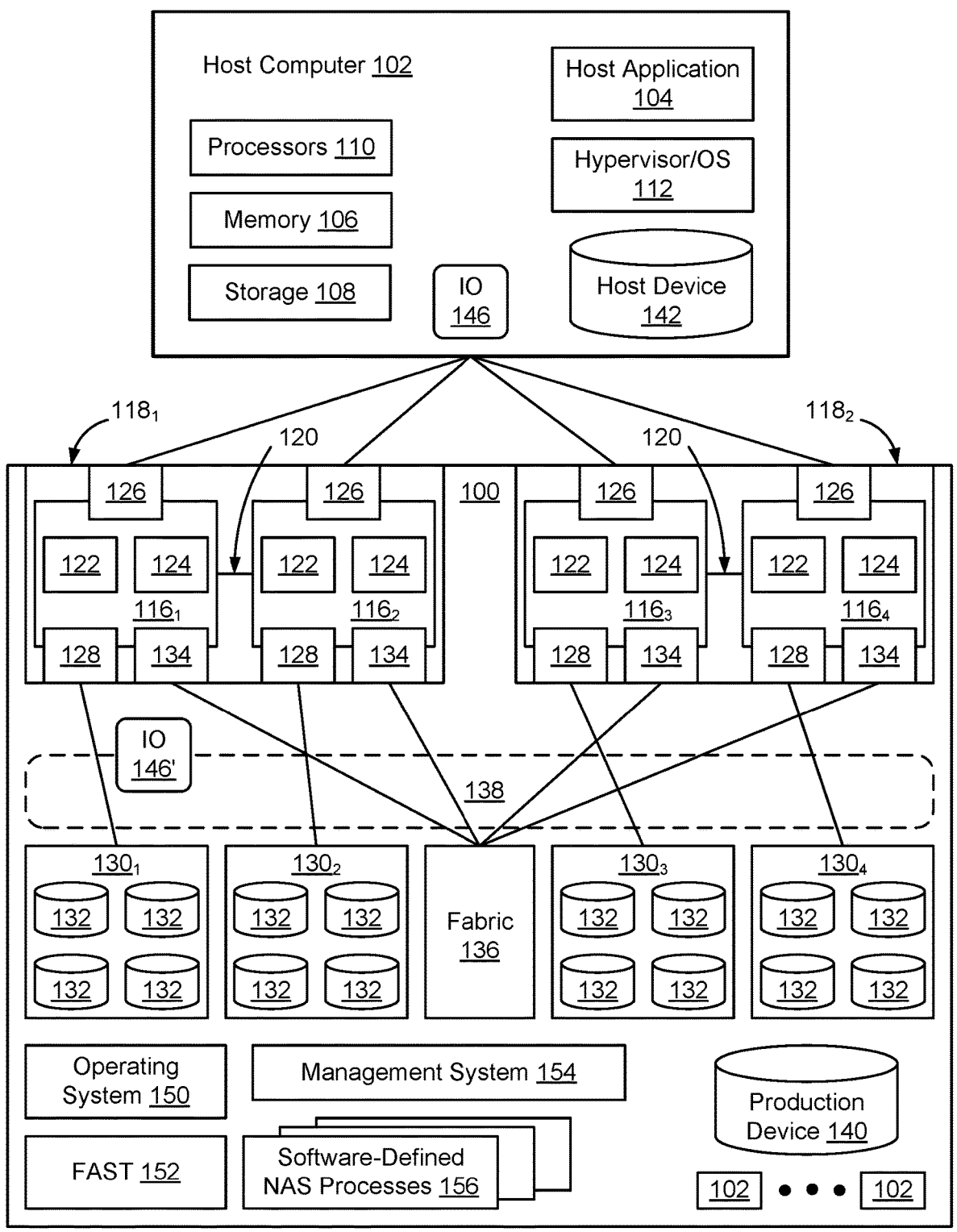
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

As shown in FIG. 1, a host application 104 may access storage resources provided by one or more storage systems 100 over a communication network. In some embodiments, the communication network is an Internet Protocol (IP) communication network enabling transmission of IP data packets through the communication network. Data from the host application 104 is stored in the storage resources 130 of the storage system 100. Storage resources that are accessed by a host application 104 over a communication network are referred to herein as Network Attached Storage (NAS). In some embodiments, the storage resources of a storage system 100 are abstracted to the host application 104 by software applications referred to herein as "Software Defined Network Attached Storage (SDNAS) applications." For example, as shown in FIG. 1, in some embodiments, the storage system 100 includes one or more software defined network attached storage processes 156 executing on the storage system, for example in emulations implemented on the storage system 100. A given SDNAS application may, in some embodiments, be implemented as a Virtual Network Attached Storage (VNAS) server.

Figure 2:
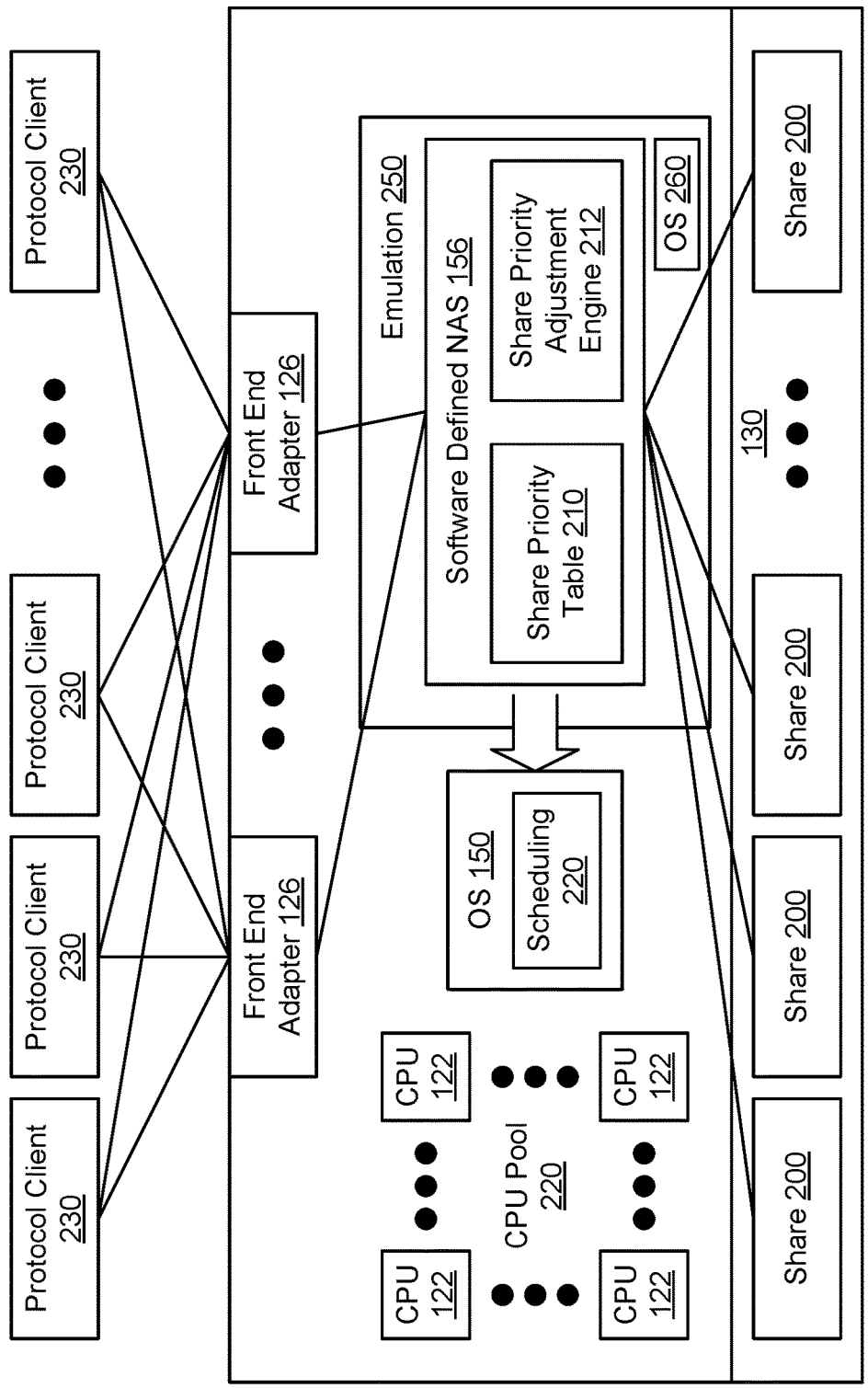
FIG. 2 is a functional block diagram of a storage system having a software defined network attached storage process configured to provide differentiated share prioritization in a storage system, according to some embodiments.

FIG. 2 is a functional block diagram of a storage system having a software defined network attached storage process 156 configured to provide differentiated share prioritization in a storage system, according to some embodiments. As shown in FIG. 2, the storage system 100 has physical resources including a number of CPU processor cores 122, storage resources 130, and other physical resources. A hypervisor abstracts the physical resources of the storage system 100 from emulations 250, and allocates physical resources of storage system 100 for use by the emulations 250.

Each emulation 250 has an operating system 260 and one or more application processes running in the context of the operating system 260. As shown in FIG. 2, in some embodiments, one or more of the emulations 250 instantiated on storage system 100 implements one or more SDNAS processes 156 to provide access to shares 200 stored in storage resources 130.

The SDNAS processes 156 allow customers to enable file sharing on the storage system 100. Shared file systems are commonly referred to as "shares" or "exports," depending on the type of underlying operating system 150. For simplicity, as used herein, the term "share" 200 will be used to refer to a shared file system that is accessible at a network address exposed on the storage system 100, and is not intended to connote the use of any particular underlying operating system.

Shares 200 are accessed by protocol clients 230. Example protocol clients include Windows SMB (Server Message Block) clients, Unix NFS (Network File System) clients, HDFS (Hadoop Distributed File System) clients, HTTP (HyperText Transfer Protocol) clients, or other types of clients. While an example will be provided focusing on SMB/NFS clients, other types of clients may similarly be used to access shares 200. Example protocol clients 230 may be, for example Oracle on NFS, Vmware on NFS, Microsoft SQL on SMB 3.0, etc.

The SDNAS process 156 generally exposes may shares 200. Protocol clients 230 can simultaneously connect to these shares 200, and conventionally have fairly/equally shared access to the SDNAS 156, when requesting access to the set of shares 200 supported by the SDNAS 156. Unfortunately, there are situations where it would be advantageous to enable one of the protocol clients 230 accessing a particular share to have priority over other protocol clients 230 accessing other shares. For example, the network administrator responsible for managing operation of the storage system 100 may prefer that an Oracle/NFS protocol client should receive higher rates of data transfer than a Vmware/NFS protocol client, or than the SDNAS 156 provides to a person who has selected to download a movie. While the underlying storage system 100 may have various ways of prioritizing IO operations, for example by prioritizing access operations to particular regions of storage resources 130, the SDNAS 156 is not able to implement this on a per-share basis, or on a per-protocol client basis. Stated differently, conventionally the SDNAS process 156 did not have a way to distinguish which application is requesting access to a particular share, and therefore the SDNAS could not be used to prioritize operations between protocol clients 230.

According to some embodiments, as shown in FIG. 2, the SDNAS process 156 is configured to implement a share priority table 210. An example share priority table 210 is shown in FIG. 3, and is discussed in greater detail below. The share priority table 210 enables priorities for the shares 200 exposed by a SDNAS process 156 to be established. When a protocol client 230 accesses a share 200, the SDNAS process 156 determines the share priority from the share priority table 210, and uses the share priorities of the various shares 200 to provide differential access to different shares 200 exposed by the SDNAS 156.

The share-based priority mechanism gives better IO performance for protocol clients 230 to higher priority shares 200, as compared to protocol clients 230 connecting to lower priority shares 200. The differentiation is made at the level of the shares 200, so that a protocol client 230 requesting data transfer from a higher priority share will be given higher priority than a protocol client 230 requesting data transfer from a lower priority share. By differentiating between shares 200, and enabling priority to be set on a per-share basis, it is possible to give preferential treatment to protocol clients accessing different shares 200. This enables the SDNAS process 156 to give better throughput for mission critical applications, and provide better user experience for premium users.

Since certain shares 200 will only be accessed by particular protocol clients, enabling per-share prioritization at the SDNAS 1560 also enables the SDNAS to effectively differentiate between access operations by different protocol clients. For example, a protocol client 230 with a lower subscription level and hence a higher storage system management system privilege may be allowed to create shares on the SDNAS 156 and be given permission to assign priority values to the shares from a lower priority range, while a protocol client 230 with a higher subscription level may be allowed to create shares on the SDNAS process 156 and be given permission to assign priority values to the shares 200 from a higher priority range. By differentiating share priorities, and tying the ability to set share priority levels to protocol client 230 access subscription level, it becomes possible to encourage protocol clients 230 to acquire higher subscription access levels. Further, as discussed below in connection with FIGS. 5-8, in some embodiments the share priorities are able to be adjusted according to usage patterns, thus enabling the share prioritization to be dynamically adjusted over time.

FIG. 3 is a functional block diagram of an example data structure configured to implement a share priority table 210 for use by the software defined network attached storage processes 156 to provide differentiated share 200 prioritization in a storage system 100, according to some embodiments. As shown in FIG. 3, in some embodiments the share priority table 210 contains entries (rows in FIG. 3) for each of the shares that is to have its access priority managed by the SDNAS 156. In some embodiments, each entry identifies the share 200 by share ID 305, share name 310, and share path 315. In some embodiments, the share ID 305 and share name 310 are used to identify the share on the storage system management system 154. The share path 315 is the path (logical address) on the storage system where the share is stored. For example, the share priority table 210 shown in FIG. 3 contains a first entry for share ID SID0001, which has been given a share name "Oracle App Data". The share path for this share is /vol0/data/oracle_data, which tells the SDNAS 156 where to find the data for the share 200. The particular manner that the actual data access operations on storage resources 130 occur will depend on the particular implementation.

In some embodiments, the shares are given priority values in the range of between 0-99, although other ranges may be used as well depending on the implementation. In this description, lower share priority values correspond to higher SDNAS access priority, and higher share priority values correspond to lower SDNAS access priority. Thus, using this scale, a share priority value of "0" is the highest possible access priority value, and a share priority value of "99" is the lowest possible access priority value. However, the opposite convention could similarly be adopted depending on the implementation.

In some embodiments, users create shares using the storage system management system 154 (see FIG. 1). When creating a share, the user selects the file path that is to be associated with the share and gives the share a name 310. The share ID 305 may be automatically generated by the SDNAS process 156, depending on the implementation. To enable shares 200 to be assigned priority values 320, in some embodiments the storage system management system 154 also enables the user to specify a share priority when creating the share 200. If no share priority value 320 is specified, the SDNAS process 156 may assign a default priority to the share, such as a default value of 50. At a later date, the user may go in to modify the share priority values 320 to set a custom value for the share 200 according to the user's preference.

In some embodiments, the SDNAS process 156 uses the share priorities 320 in the share priority table 210 to assign IO priorities for share IO requests from protocol clients 230. For example, the priorities of the shares 200 can be used by the SDNAS process 156 to change IO priority of the request context on the storage system 100.

The particular manner in which IO priorities are implemented will depend on the underlying technology used to implement IO operations on the storage system 100. As an example, if the operating system 150 used by storage system 100 is based on Linux, Linux has the notion of IO priority and this underlying capability can be exploited by the SDNAS 156 to differentiate share access IO operations on different shares. For example, if the Linux operating system has 8 levels of IO priority (labeled 0-7 with 0 being the highest priority), the share priorities contained in the share priority table 210 may be converted into 8 ranges and used to specify, to the OS 150, which priority level the OS 150 should use when handling a particular request.

In an example where share priorities are set from a scale of 0-99, and the OS allows for 8 System IO Priority (SIOP) IO priority levels (range of 0-7), the share priorities 320 from the share priority table 210 may be converted using the following algorithm: System Priority=share priority/13. When the SDNAS sends the IO to the OS, the SDNAS will include the system priority value with the IO operation, to thus enable the OS 150 to provide differentiated prioritization to IO operations on different shares 200. This enables the SDNAS 156 to achieve varying IO bandwidth for different protocol clients 230 accessing different shares 200.

It is also possible to use the share priorities 320 to adjust CPU priorities. For example, the Linux scheduling mechanism uses 140 CPU priority levels. Generally Linux priority levels 0-99 are used for real-time processes and Linux priority levels 100-139 are used for normal (e.g. user) processes. In some embodiments, the SDNAS process 156 maps the share priorities 320 into a range of Linux process priority levels. For example, assume that the SDNAS 156 would like the Linux scheduling mechanism to assign share access operations in a range centered at 40, with a variation of +/−10. To do this, the share priority values from the table can be divided into 20 ranges [−10 . . . 0 . . . +10], where −10 is the highest priority, for example using the following equation: share_cpu_priority=(share_priority/5)−10. This share_cpu_priority is then added to the range center value (40 in this example) to cause the priority values 320 specified in the share priority table 210 to be used by the Linux scheduling mechanism to differentially prioritize execution of different share access operations on the CPUs 122 of the storage system 100. Although a particular method of mapping the share priority values 320 from the share priority table 210 to a CPU scheduling mechanism was provided, it should be realized that other mappings could likewise be utilized depending on the implementation.

Figure 4:
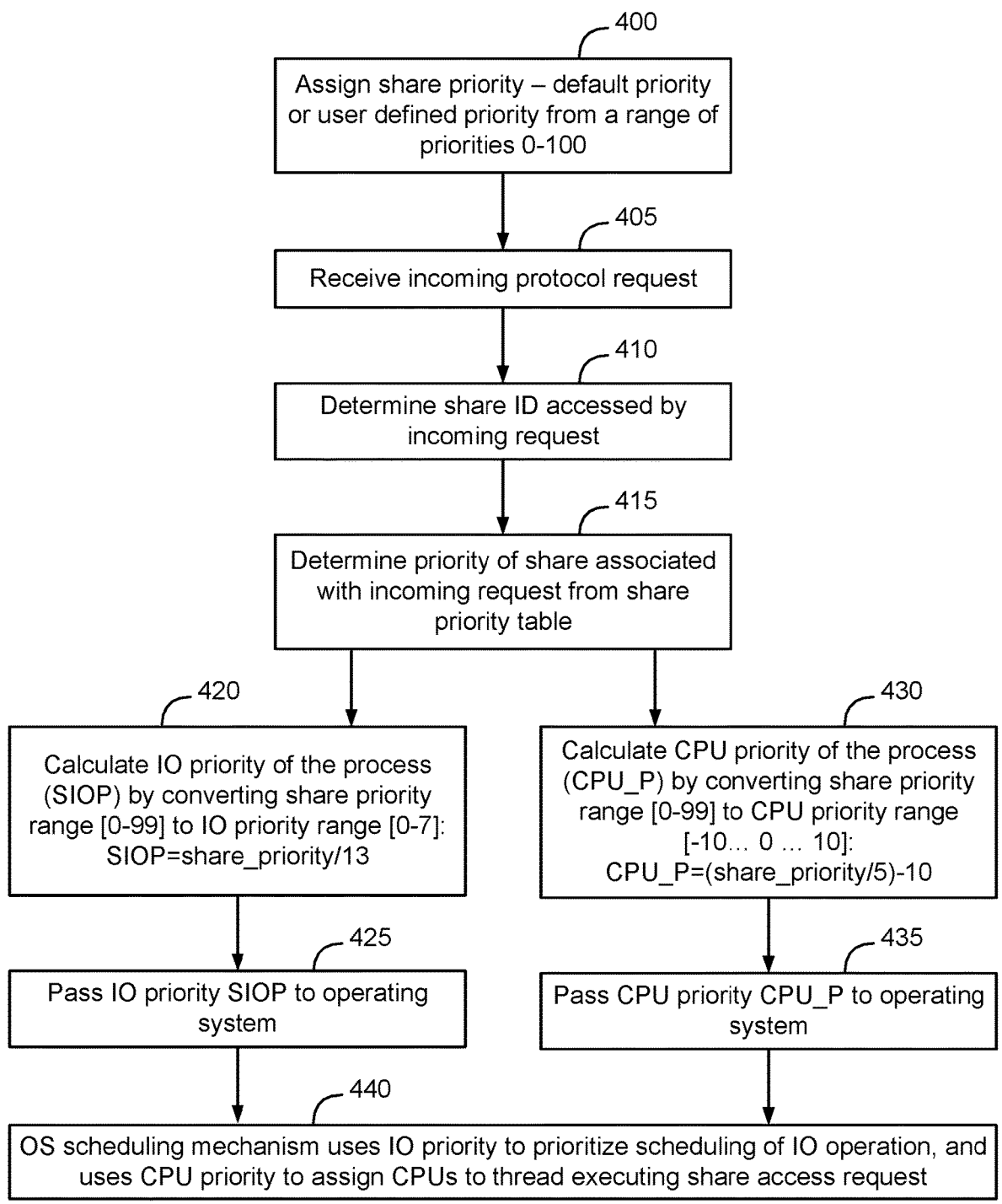
FIG. 4 is a flow chart of an example method of providing differentiated share prioritization in a storage system, according to some embodiments.

FIG. 4 is a flow chart of an example method of providing differentiated share prioritization in a storage system, according to some embodiments. As shown in FIG. 4, shares 200 are assigned share priority values 320, either manually for example when a share is created or modified, or by default (block 400). Share priority values 320 may be assigned from a share priority range, for example from 0-99, or using some other predetermined share priority range.

In some embodiments, the range of share priorities that a user is allowed to assign to a particular share may be based on a privilege level associated with the user, for example a permission level or subscription level of the user. For example, if the SDNAS enables share priority values in a range of 0-99, with 0 being the highest priority, a user with a high value subscription may be allowed to assign shares share priority values using the entire range (0-99). By contrast, a user with a lower value subscription may be restricted and only allowed to assign shares share priority values using a range of between 50-99. By restricting the ability of the lower value subscription to assign higher priority share access values, it is possible to provide differential access to users with different subscription levels on the SDNAS process 156.

When an incoming share access is received by the SDNAS 156 from a protocol client 230 (block 405), the SDNAS will identify the share associated with the share access request (block 410) and use the share ID or other information from the share access request to determine the share priority from the share priority table 210 (block 415).

The SDNAS 156 will then calculate an IO priority for the request by converting the share priority 320 to the IO priority range supported by the storage system operating system (block 420). For example, if the range of share priorities 320 in the share priority table 210 extends from 0-99, and the IO priority range supported by the scheduling mechanism of the storage system OS is from 0-7, the share priority 320 is converted to select a system priority (SIOP) between 0-7. In addition, or alternatively depending on the implementation, in some embodiments the SDNAS 156 calculates the CPU priority of the process (CPU_P) by converting the share priority range to a range of CPU priorities (block 430).

The IO priority (SIOP) and the CPU priority (CPU_P) scores are passed by the SDNAS 156 to the OS 150 when the SDNAS submits the share access request to the OS 150 for implementation (blocks 425, 435). The OS scheduling mechanism uses IO priority to prioritize scheduling of IO operation, and uses CPU priority to assign CPUs to the thread implementing the share access request (block 440).

By providing differentiated share prioritization, it becomes possible for a system administrator to directly specify priority variations between different shares. This provides flexibility for the system administrator to directly specify which of the shares should be handled with higher priority on the storage system, and which of the shares should be handled with lower priority on the storage system. In turn, these share priority values are used by the SDNAS process 156 to specify to the storage system operating system 150 how to prioritize particular share access requests, so that the operating system 150 can schedule the share access requests and allocate CPU resources to the threads executing the share access requests in a differentiated manner, as controlled by the system administrator, without requiring the system administrator to adjust underlying operation of the storage system itself.

In addition to enabling shares priority values to be specified, in some embodiments the SDNAS 156 is also configured to dynamically adjust the share priority values over time, for example based on share usage information. In some embodiments, a daemon periodically executes to evaluate share usage during a preceding time interval, and calculates an average usage value over a set of preceding time intervals. In some embodiments the usage values are based on use factors, such as the average number of protocol client connections on a share, the average number of reads on the share, and other factors such as whether the share supports Server Message Block (SMB) continuous availability.

The share usage values over a set of monitoring intervals are used to determine an average usage value for the share, which is compared with minimum and maximum usage thresholds. Share priority values for shares that have an average usage value above the maximum usage threshold are dynamically increased. Share priority values for shares that have average usage values below the minimum usage threshold are dynamically decreased. Share priority values for shares that are experiencing average usage values between the maximum and minimum usage thresholds remain unchanged.

By continuously adjusting share priority values that are assigned to the shares, shares with higher average usage values are able to be provided with temporarily higher share priority, to thus accelerate access to the more frequently accessed shares. This provides the SDNAS with the ability to give preferential treatment to protocol clients accessing different shares, provides better throughput for mission critical applications, and enables the system to dynamically adapt to changes in usage patterns by providing increased share priorities to highly used shares and lower share priorities to less frequently used shares.

A given SDNAS may provide access to hundreds of shares. Additionally, a given storage system 100 may have multiple SDNAS processes executing thereon to provide access to multiple protocol clients. Further, different protocol clients may exhibit different access patterns on different shares at different times, such that the average number of access operations, the type of access operations, and the size of the 10 operations on the shares may vary dramatically over time. All of these factors make it difficult to optimize allocation of share priorities between the shares. For example, if a particular share is experiencing higher than average activity, it may be preferable to temporarily increase its share priority to reduce the latency associated with access operations on that share.

According to some embodiments, the SDNAS process 156 includes a share priority adjustment engine 212 configured to dynamically determine share priority values based on multiple factors. Example factors include, for example, if the share supports SMB encryption, if the share supports SMB continuous availability, the average number of connections on a share, the average number of reads on a share, the average number of writes on a share, and the average number of files transferred. Based on usage values, the share priority adjustment engine 212 dynamically adjusts the share priorities, to enable the share priority values assigned to shares with higher usage values to be increased, and to enable the share priority values assigned to shares with lower usage values to be decreased.

Figure 5:
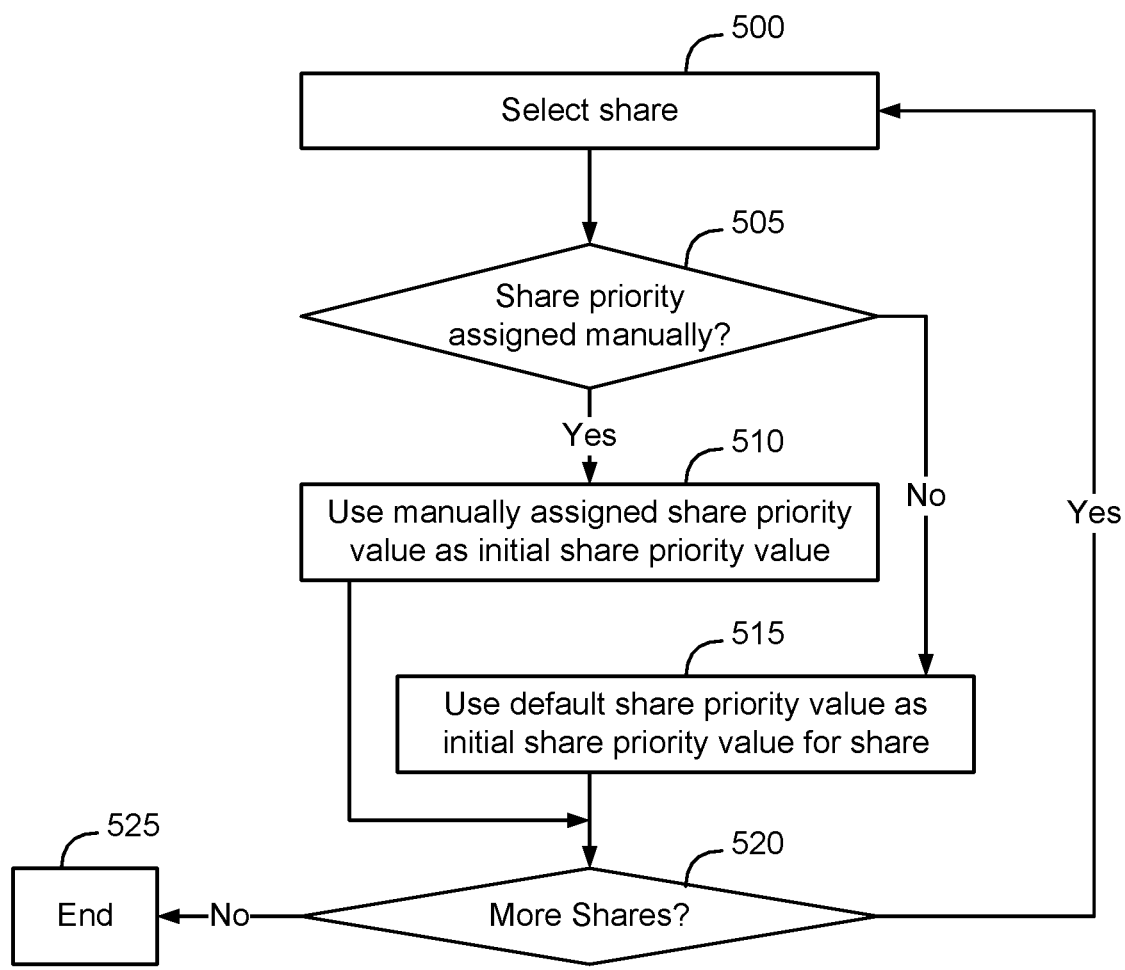
FIG. 5 is a flowchart of an example process of assigning initial share priorities, according to some embodiments.

FIG. 5 is a flowchart of an example process of assigning initial share priorities, according to some embodiments. As shown in FIG. 5, in some embodiments a share is selected, for example when a share is first created or when an existing share is to be assigned a share priority value (block 500). A determination is then made as to whether the share will be assigned a share priority value manually, for example by being explicitly assigned by a user (block 505). If a share priority value is manually assigned to the share (a determination of YES at block 505) the SDNAS 156 will use the manually assigned share priority value as an initial share priority value for the share (block 510).

If a share priority is not manually assigned to the share (a determination of NO at block 505) the SDNAS 156 will use a default share priority value as an initial share priority value for the share (block 515). In some embodiments, when the share is created, provisioning the share on the SDNAS 156 requires various attributes of the share to be specified. Example share attributes might include the type of share, whether the share supports encryption, and whether the share supports continuous availability. In some embodiments, the SDNAS 156 uses these specified share attributes when determining a default share priority value for the share in block 515. Where different users have different access levels on the SDNAS 156, the access level of the user may also be used by the SDNAS in connection with selecting a default share priority value for the share.

A determination is then made as to whether there are more shares that require an initial share priority value to be assigned (block 520). If there are additional shares that need assignment of an initial share priority value (a determination of YES at block 520), the process returns to block 500 to select a next subsequent share. If there are no additional shares that need assignment of an initial share priority value (a determination of NO at block 520) the initial share priority value assignment process ends (block 525).

Figure 6:
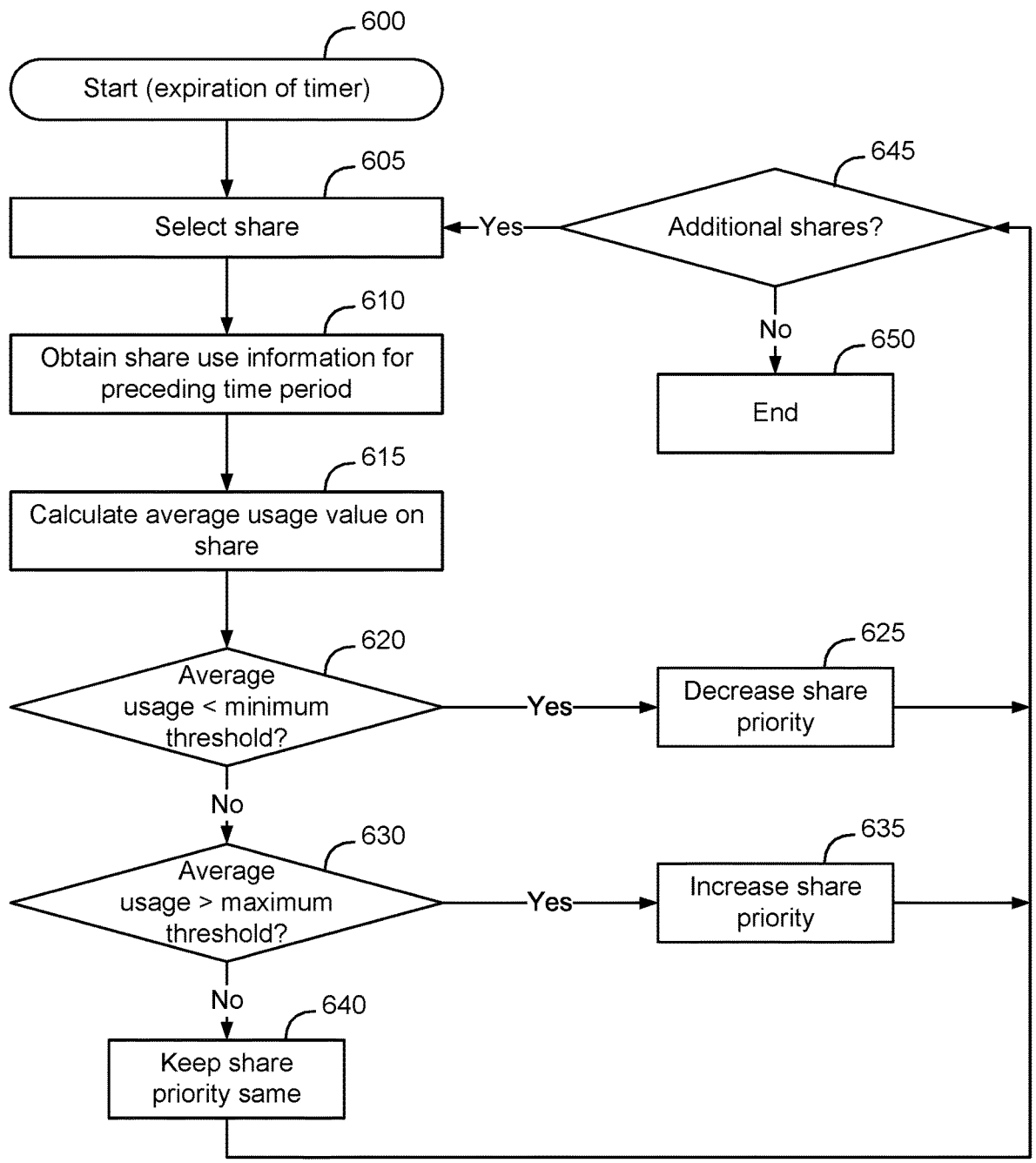
FIG. 6 is a flowchart of an example process of dynamically adjusting differentiated share prioritization in a storage system, according to some embodiments.

FIG. 6 is a flowchart of an example process of dynamically adjusting differentiated share prioritization in a storage system 100, according to some embodiments. As shown in FIG. 6, in some embodiments a share priority adjustment engine 212 in the SDNAS 156 is configured to periodically evaluate share priorities and adjust the share priorities to optimize the share priority values that are assigned to the shares on the SDNAS 156. For example, the share priority adjustment engine 212 may initiate share priority adjustment process after a predetermined time interval of x minutes (block 600). An example time interval may be 15 or 30 minutes, although the specific time interval may depend on the particular implementation.

During a dynamic share priority adjustment process, the share priority adjustment engine 212 will select a share (605) and obtain share usage information for the share over the preceding time interval x (block 610). The share usage information is used to compute a share usage value over the time interval x. In some embodiments, the usage value during time interval x is based on the following function:

$$f(x)=(K*a+L*b+M*c)/(K+L+M)$$

where:
x=time t (current time);
a=an average number of protocol client connections on the share;
b=average number of reads on the share;
c=is binary (1 or 0) based on whether the share supports SMB continuous availability; and
K, L, and M are weights of the desired property.

Although an example usage function is shown that relies on several particular use factors, it should be realized that other usage functions may incorporate other use factors, such as: the average number of writes on the share, the average size of files transferred, whether the share supports SMB encryption, and other factors, each of which may be weighted depending on the implementation.

The usage values for a predetermined number of time intervals (e.g. 5-10 time intervals x) are then used to compute an average usage value for the share over the preceding set of time intervals T (block 615):

$$\text{average\_usage}(x)=\text{Sum}(f(x)+f(x-1)+f(x-2)\ldots f(x-T))/T$$

The share priority adjustment engine 212 compares the average usage value of the share (average_usage(x)) with a minimum usage threshold (block 620). The minimum usage threshold, in some embodiments, is a share priority demotion threshold. If the average usage value of the share over the preceding time T is below the minimum usage threshold (a determination of YES at block 620), the share priority value of the share is decreased (block 625). The decrease in share priority, in some embodiments, is a set amount, such as one priority level or a set number of priority levels greater than one. In other embodiments, the decrease in share priority may be based on a difference between the average usage value and the minimum usage threshold. The particular manner in which the share priority value is decreased may depend on the particular implementation.

If the average usage value of the share over the preceding time T is not below the minimum usage threshold (a determination of NO at block 620), the share priority adjustment engine 212 compares the average usage value of the share (average_usage(x)) with a maximum usage threshold (block 630). If the average usage value of the share over the preceding time T is above the maximum usage threshold (a determination of YES at block 620), the share priority value of the share is increased (block 625). The increase in share priority, in some embodiments, is a set amount, such as one priority level or a set number of priority levels greater than one. In other embodiments, the increase in share priority may be based on a difference between the average usage value and the maximum usage threshold. The particular manner in which the share priority value is increased may depend on the particular implementation.

The order in which the comparisons of blocks 620 and 630 are implemented can be changed, depending on the particular implementation. In some embodiments, if the average usage value of the share over the preceding time T is not below the minimum usage threshold (a determination of NO at block 620), and the average usage value of the share over the preceding time T is not above the maximum usage threshold (a determination of NO at block 630), the share priority value is maintained at its current value (block 640).

Once the share priority value has been decreased (block 625), increased (block 635) or kept the same (block 640), the share priority adjustment engine returns to determine if there are any additional shares to evaluate (block 645). If there are additional shares (a determination of YES at block 645) the share priority adjustment engine selects another share (block 605) and begins the dynamic share priority adjustment process for the subsequent share. This process iterates until there are no additional shares to be evaluated (a determination of NO at block 645) at which point dynamic share priority adjustment process ends (block 650). Upon expiration of the timer (block 600) the share priority adjustment engine will once again re-start a subsequent dynamic share priority adjustment process.

By using minimum usage threshold and maximum usage thresholds, and averaging share usage values over a number T of preceding time intervals x, it is possible to prevent share priorities from changing too rapidly. In some embodiments, the length of the time interval x is used to specify the expiration of the timer in block 600 that causes the share priority adjustment engine to initiate the dynamic share priority adjustment process. The length of the time interval x, the number of time intervals T, the use factors considered by the usage function f(x), the weights K, L, and M that are applied to the use factors in the usage function f(x), are all able to be controlled to optimize the manner in which the share priority adjustment engine 212 implements the process of dynamically adjusting share priorities on the storage system.

Figure 7:
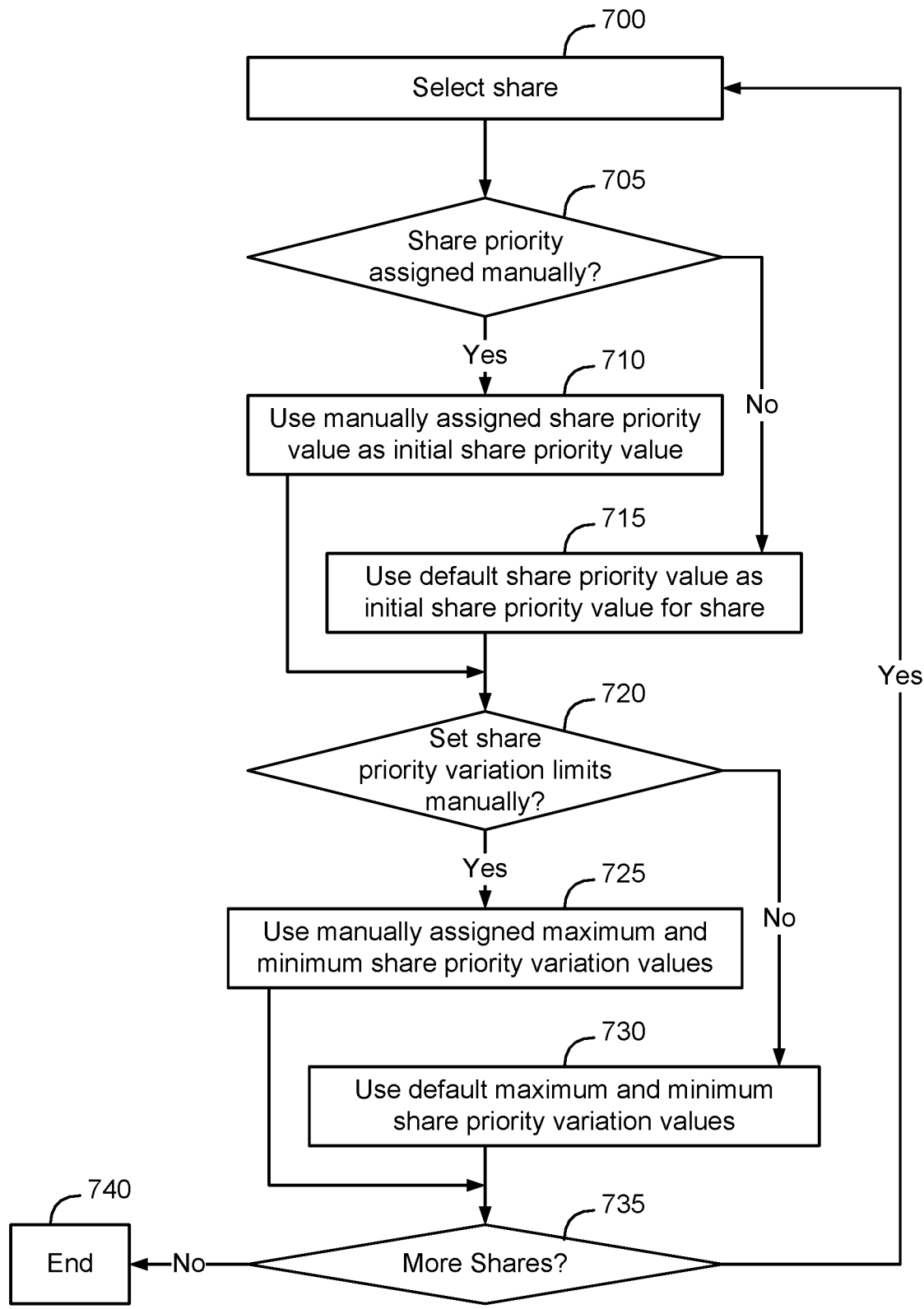
FIG. 7 is a flowchart of another example process of assigning initial share priorities, according to some embodiments.

FIG. 7 is a flowchart of another example process of assigning initial share priorities, and FIG. 8 is a flowchart of another example process of dynamically adjusting differentiated share prioritization in a storage system, according to some embodiments. In FIGS. 7 and 8, in addition to setting initial share priority values, maximum and minimum share priority variation limits are also specified for each share. The maximum and minimum share priority variation limits specify how much the share priority value for the share can be increased or decreased by the dynamic share priority adjustment process of FIG. 8, to thereby prevent the share priority value of a share from deviating significantly from its original share priority value. For example, if an initial share priority value is set at 30, the maximum share priority increase variation limit is set at −10, and the minimum share priority decrease variation limit is set at +15 (note that lower numbers correlate to higher priority), the share priority adjustment engine 212 will be constrained, during the dynamic share priority adjustment process of FIG. 8, to assigning a share priority value to the share of between 20-45 (30−10=20 and 30+15=45).

As shown in FIG. 7, in some embodiments a share is selected, for example when a share is first created or when an existing share is to be assigned a share priority value (block 700). A determination is then made as to whether the share will be assigned a share priority value manually, for example by being explicitly assigned by a user (block 705). If a share priority value is manually assigned to the share (a determination of YES at block 705) the SDNAS will use the manually assigned share priority value as an initial share priority value for the share (block 710).

If a share priority is not manually assigned to the share (a determination of NO at block 705) the SDNAS will use a default share priority value as an initial share priority value for the share (block 715). In some embodiments, when the share is created, provisioning the share on the SDNAS requires various attributes of the share to be specified. For example, the type of share, whether the share supports encryption, and whether the share supports continuous availability may be specified to the SDNAS. In some embodiments, the SDNAS uses these specified share attributes when determining a default share priority value for the share in block 715.

A determination is then made as to whether share priority variation limits should be set manually for the share (block 720). If the share priority increase and decrease variation limits are to be set manually (a determination of YES at block 720), the user-specified manually assigned maximum and minimum priority variation values are assigned to the share (block 725) and used by the share priority adjustment engine 212 to limit how much the share priority for the share will be adjusted during the dynamic share priority adjustment process (see FIG. 8).

If the share priority increase and decrease variation limits are not set manually (a determination of NO at block 720), default maximum and minimum priority variation values are assigned to the share (block 730) and used by the share priority adjustment engine 212 to limit how much the share priority for the share will be adjusted during the dynamic share priority adjustment process (see FIG. 8). The default maximum and minimum priority variation values may be user specified values, e.g. IO priority levels. Alternatively, the default maximum and minimum priority variation values may be based on a subscription level of a user, such that, for example, the default value of the default priority variation values for a user with a high value subscription may be set to enable the share priority value to range across an entire range of priorities (e.g. 0-99), whereas the default priority variation values for a user with a low value subscription may be set to enable the share priority value to be restricted and only allowed to vary within the limited range of allowable share priority values for that user, e.g. within a range of between 50-99.

A determination is then made as to whether there are more shares that require an initial share priority value to be assigned (block 735). If there are additional shares that need assignment of an initial share priority value (a determination of YES at block 735), the process returns to block 700 to select a next subsequent share. If there are no additional shares that need assignment of an initial share priority value (a determination of NO at block 735) the initial share priority value assignment process ends (block 740).

FIG. 8 is a flowchart of an example process of dynamically adjusting differentiated share prioritization in a storage system, according to some embodiments. As shown in FIG. 8, in some embodiments a share priority adjustment engine 212 in the SDNAS 156 is configured to periodically evaluate share priorities and adjust the share priorities to optimize the share priority values that are assigned to the shares on the SDNAS 156. For example, the share priority adjustment engine 212 may initiate a share priority adjustment process after a predetermined time interval of x minutes (block 800). An example time interval may be 15 or 30 minutes, although the specific time interval x may depend on the particular implementation.

During a dynamic share priority adjustment process, the share priority adjustment engine 212 will select a share (block 805) and obtain share usage information for the share over the preceding time interval x (block 810). The share usage information is used to compute a share usage value over the time interval x. In some embodiments, the usage value during time interval x is based on the a share usage function f(x). An example share usage function is:

$$f(x)=(K*a+L*b+M*c)/(K+L+M)$$

where:
x=time t (current time);
a=an average number of protocol client connections on the share;
b=average number of reads on the share;
c=is binary (1 or 0) based on whether the share supports SMB continuous availability; and
K, L, and M are weights of the desired property.

Although an example usage function is shown that relies on several particular use factors, it should be realized that other usage functions may incorporate other use factors, such as: the average number of writes on the share, the average size of files transferred, whether the share supports SMB encryption, and other factors, each of which may be weighted depending on the implementation The usage values for a predetermined number of time intervals (e.g. 5-10 time intervals x) are then used to compute an average usage value for the share over the preceding set of time intervals T (block 815):

$$\text{average\_usage}(x)=\text{Sum}(f(x)+f(x-1)+f(x-2)\ldots f(x-T))/T$$

The share priority adjustment engine 212 then compares the average usage value of the share (average_usage(x)) with a minimum usage threshold (block 820). The minimum usage threshold, in some embodiments, is a share priority demotion threshold. If the average usage value of the share over the preceding time T is below the minimum usage threshold (a determination of YES at block 820) it would be preferable to decrease the share priority value assigned to the share. However, to prevent the share priority from being decreased beyond the share priority decrease variation limit, a second determination is made as to whether the current share priority value is above the minimum possible share priority value, as specified in the share priority decrease variation limit (block 825). If the current share priority value is greater the minimum possible share priority value (a determination of YES at block 825) the share priority is decreased (block 830). If the current share priority value is not greater than the minimum possible share priority value (a determination of NO at block 825) the share priority is kept the same (block 835).

If the share priority is decreased (block 830), the decrease in share priority, in some embodiments, is a set amount, such as one priority level or a set number of priority levels greater than one. In other embodiments, the decrease in share priority may be based on a difference between the average usage value and the minimum usage threshold. The decrease may also be restricted to not cause the share priority value to go below the minimum share priority value specified by the share priority decrease variation limit. The particular manner in which the share priority value is decreased may depend on the particular implementation.

If the average usage value of the share over the preceding time T is not below the minimum usage threshold (a determination of NO at block 820), the share priority adjustment engine 212 also compares the average usage value of the share (average_usage(x)) with a maximum usage threshold (block 830). If the average usage value of the share over the preceding time T is above the maximum usage threshold (a determination of YES at block 820), it would be preferable to increase the share priority value assigned to the share. However, to prevent the share priority from being increased beyond the share priority increase variation limit, a second determination is made as to whether the current share priority value is below the maximum possible share priority value, as specified in the share priority increase variation limit (block 845). If the current share priority value is below the maximum possible share priority value (a determination of YES at block 845) the share priority is increased (block 850). If the current share priority value is not less than the maximum possible share priority value (a determination of NO at block 845) the share priority is kept the same (block 855).

If the share priority is increased (block 850), the increase in share priority, in some embodiments, is a set amount, such as one priority level or a set number of priority levels greater than one. In other embodiments, the increase in share priority may be based on a difference between the average usage value and the maximum usage threshold. The increase may also be restricted to not cause the share priority value to exceed the maximum share priority value specified by the share priority increase variation limit. The amount that the share priority value is increased may depend on the particular implementation.

The order in which the comparisons of blocks 820 and 840 are implemented can be changed, depending on the particular implementation. In some embodiments, if the average usage value of the share over the preceding time T is not below the minimum usage threshold (a determination of NO at block 820), and the average usage value of the share over the preceding time T is not above the maximum usage threshold (a determination of NO at block 840), the share priority value is maintained at its current value (block 860).

Once the share priority value has been decreased (block 830), increased (block 850) or kept the same (blocks 835, 855, or 860), the share priority adjustment engine returns to determine if there are any additional shares to evaluate (block 865). If there are additional shares (a determination of YES at block 865) the share priority adjustment engine selects another share (block 805) and begins the dynamic share priority adjustment process for the subsequent share. This process iterates until there are no additional shares to be evaluated (a determination of NO at block 865) at which point dynamic share priority adjustment process ends (block 870). Upon expiration of the timer (block 800) the share priority adjustment engine will once again re-start a subsequent dynamic share priority adjustment process.

By using minimum usage threshold and maximum usage thresholds, and averaging share usage values over a number T of preceding time intervals x, it is possible to prevent share priorities from changing too rapidly. By specifying share priority increase and decrease variation limits, it is possible to constrain movement of the share priority values within ranges, to prevent share priority values from varying too extensively over time. In some embodiments, the length of the time interval x is used to specify the expiration of the timer in block 800 that causes the share priority adjustment engine to initiate the dynamic share priority adjustment process. The length of the time interval x, the number of time intervals T, the use factors considered by the usage function f(x), the weights K, L, and M that are applied to the use factors in the usage function f(x), and the share priority variation limits are all able to be controlled, to optimize the manner in which the share priority adjustment engine 212 implements the process of dynamically adjusting share priorities on the storage system.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of dynamically adjusting differentiated share prioritization in a storage system, the computer program including a set of instructions which, when executed by a computer, cause the computer to perform a method comprising the steps of:
   instantiating a Software Defined Network Attached Storage (SDNAS) process on a storage system;
   exposing shares by the SDNAS process to protocol clients;
   maintaining a share priority table, by the SDNAS process, the share priority table correlating share priority values with the exposed shares;
   determining average usage values by the exposed shares;
   comparing the average usage values with a minimum usage threshold;
   decreasing share priority values of shares that have a respective average usage value below the minimum usage threshold;
   comparing the average usage values of at least some of the shares with a maximum usage threshold; and
   increasing share priority values of shares that have a respective average usage value below the maximum usage threshold.

2. The non-transitory tangible computer readable storage medium of claim 1,
   wherein determining average usage values comprises using a weighted usage function reliant based on a set of weighted usage factors over a preceding time interval.

3. The non-transitory tangible computer readable storage medium of claim 2, wherein the usage factors include an average number of protocol client connections on a particular share, an average number of reads operations on the particular share, an average number of write operations on the particular share, and whether the particular share supports continuous availability.

4. The non-transitory tangible computer readable storage medium of claim 1, wherein decreasing share priority values comprises, for a particular share, decreasing a share priority value associated with the particular share by a set amount.

5. The non-transitory tangible computer readable storage medium of claim 1, wherein decreasing share priority values comprises, for a particular share, decreasing a share priority value associated with the particular share by an amount related a difference between the usage value of the particular share and the minimum usage threshold.

6. The non-transitory tangible computer readable storage medium of claim 1, wherein increasing share priority values comprises, for a particular share, increasing a share priority value associated with the particular share by a set amount.

7. The non-transitory tangible computer readable storage medium of claim 1, wherein increasing share priority values comprises, for a particular share, increasing a share priority value associated with the particular share by an amount related a difference between the usage value of the particular share and the maximum usage threshold.

8. The non-transitory tangible computer readable storage medium of claim 1, wherein the share priority table further contains upper and lower share priority value variation limits for the exposed shares.

9. The non-transitory tangible computer readable storage medium of claim 8, if a particular share usage value is below the minimum usage threshold, the method comprising:
   comparing a current share priority value for the particular share with a respective lower share priority value variation limit for the particular share; and
   not decreasing the current share priority value for the particular share if decreasing the current share priority value would cause the share priority value for the particular share to exceed the respective lower share priority value variation limit for the particular share.

10. The non-transitory tangible computer readable storage medium of claim 8, if a particular share usage value is below the minimum usage threshold, the method comprising:
    comparing a current share priority value for the particular share with a respective upper share priority value variation limit for the particular share; and
    not increasing the current share priority value for the particular share if increasing the current share priority value would cause the share priority value for the particular share to exceed the respective upper share priority value variation limit for the particular share.

11. A method of dynamically adjusting differentiated share prioritization in a storage system, comprising the steps of:
    instantiating a Software Defined Network Attached Storage (SDNAS) process on a storage system;
    exposing shares by the SDNAS process to protocol clients;
    maintaining a share priority table, by the SDNAS process, the share priority table correlating share priority values with the exposed shares;
    determining average usage values by the exposed shares;
    comparing the average usage values with a minimum usage threshold;
    decreasing share priority values of shares that have a respective average usage value below the minimum usage threshold;
    comparing the average usage values of at least some of the shares with a maximum usage threshold; and
    increasing share priority values of shares that have a respective average usage value below the maximum usage threshold.

12. The method of claim 11, wherein determining average usage values comprises using a weighted usage function reliant based on a set of weighted usage factors over a preceding time interval.

13. The method of claim 12, wherein the usage factors include an average number of protocol client connections on a particular share, an average number of reads operations on the particular share, an average number of write operations on the particular share, and whether the particular share supports continuous availability.

14. The method of claim 11, wherein decreasing share priority values comprises, for a particular share, decreasing a share priority value associated with the particular share by a set amount.

15. The method of claim 11, wherein decreasing share priority values comprises, for a particular share, decreasing a share priority value associated with the particular share by an amount related a difference between the usage value of the particular share and the minimum usage threshold.

16. The method of claim 11, wherein increasing share priority values comprises, for a particular share, increasing a share priority value associated with the particular share by a set amount.

17. The method of claim 11, wherein increasing share priority values comprises, for a particular share, increasing a share priority value associated with the particular share by an amount related a difference between the usage value of the particular share and the maximum usage threshold.

18. The method of claim 11, wherein the share priority table further contains upper and lower share priority value variation limits for the exposed shares.

19. The method of claim 18, if a particular share usage value is below the minimum usage threshold, the method comprising:
- comparing a current share priority value for the particular share with a respective lower share priority value variation limit for the particular share; and
- not decreasing the current share priority value for the particular share if decreasing the current share priority value would cause the share priority value for the particular share to exceed the respective lower share priority value variation limit for the particular share.

20. The method of claim 18, if a particular share usage value is below the minimum usage threshold, the method comprising:
- comparing a current share priority value for the particular share with a respective upper share priority value variation limit for the particular share; and
- not increasing the current share priority value for the particular share if increasing the current share priority value would cause the share priority value for the particular share to exceed the respective upper share priority value variation limit for the particular share.

* * * * *